(12) United States Patent
Kabe

(10) Patent No.: US 8,004,824 B2
(45) Date of Patent: Aug. 23, 2011

(54) SOLID ELECTROLYTIC CAPACITOR ELEMENT AND SOLID ELECTROLYTIC CAPACITOR USING SAME

(75) Inventor: Isao Kabe, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 760 days.

(21) Appl. No.: 11/996,869

(22) PCT Filed: Jul. 25, 2006

(86) PCT No.: PCT/JP2006/314675
§ 371 (c)(1),
(2), (4) Date: Jan. 25, 2008

(87) PCT Pub. No.: WO2007/013456
PCT Pub. Date: Feb. 1, 2007

(65) Prior Publication Data
US 2010/0284128 A1    Nov. 11, 2010

Related U.S. Application Data

(60) Provisional application No. 60/704,460, filed on Aug. 2, 2005.

(30) Foreign Application Priority Data

Jul. 26, 2005   (JP) .................. 2005-216453

(51) Int. Cl.
*H01G 9/00* (2006.01)

(52) U.S. Cl. ........ 361/523; 361/516; 361/519; 361/525; 361/528; 361/529

(58) Field of Classification Search .......... 361/523, 361/516–519, 520–529, 540–541, 502–504, 361/530; 29/25.01, 25.03
See application file for complete search history.

(56) References Cited

U.S. PATENT DOCUMENTS

| 6,381,121 | B1 | 4/2002 | Monden et al. |
| 6,519,135 | B2 * | 2/2003 | Sano et al. ..................... 361/510 |
| 6,876,083 | B2 * | 4/2005 | Yano et al. ..................... 257/764 |
| 6,909,596 | B2 * | 6/2005 | Shimoyama et al. ......... 361/523 |
| 7,522,404 | B2 * | 4/2009 | Naito et al. .................... 361/532 |

FOREIGN PATENT DOCUMENTS

| JP | 4332112 A | 11/1992 |
| JP | 5159987 A | 6/1993 |
| JP | 11135377 A | 5/1999 |
| JP | 2003-203828 A | 7/2003 |
| JP | 200479838 A | 3/2004 |
| JP | 2004221224 A | 8/2004 |
| JP | 2004304063 A | 10/2004 |
| WO | 0049632 A1 | 8/2000 |

* cited by examiner

*Primary Examiner* — Nguyen T Ha
(74) *Attorney, Agent, or Firm* — Sughrue Mion, PLLC

(57) ABSTRACT

The invention provides a solid electrolytic capacitor element, comprising a metal oxide layer, an electroconductive polymer layer, a carbon paste layer and a silver paste layer sequentially formed on surface of a valve-acting metal material, wherein thickness of the silver paste layer is within a range of 5 to 20 μm and the mass ratio of silver contained in the silver paste layer is within a range of 84 to 94%. According to the invention, a solid electrolytic capacitor having good electric properties such as ESR (equivalent series resistance) and LC (leakage current) and good reliability can be produced.

11 Claims, 1 Drawing Sheet

[Fig. 1]
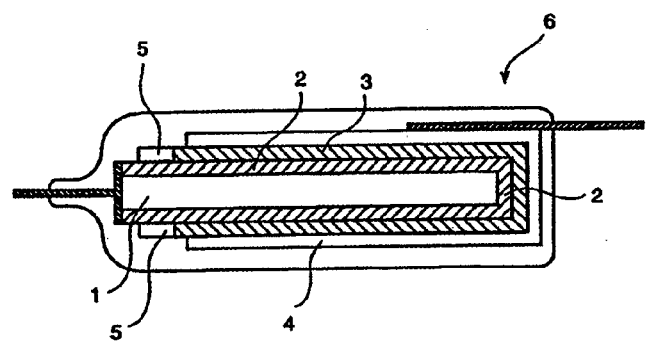
[Fig. 2]
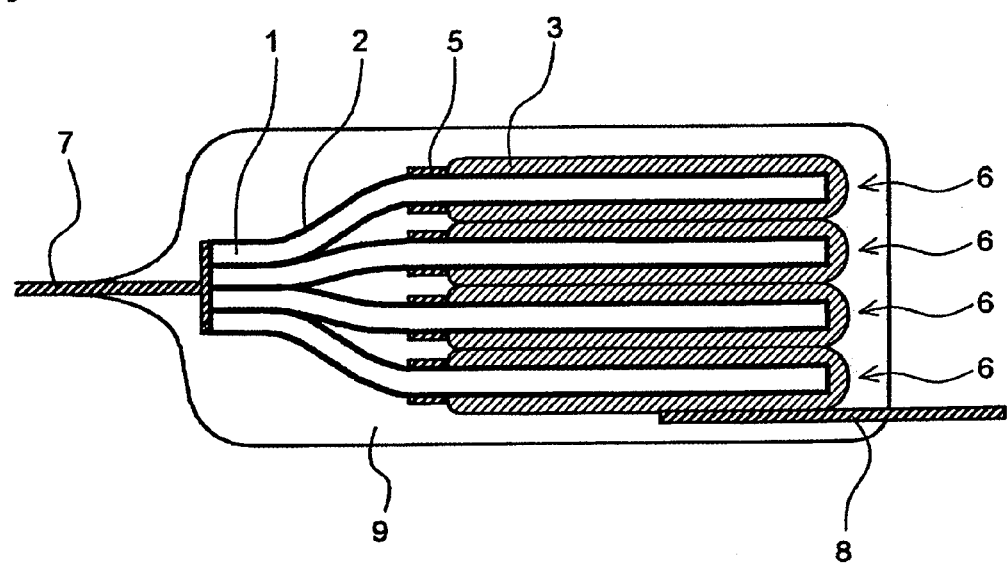

SOLID ELECTROLYTIC CAPACITOR ELEMENT AND SOLID ELECTROLYTIC CAPACITOR USING SAME

CROSS-REFERENCE TO RELATED APPLICATIONS

This is an application filed pursuant to 35 U.S.C. Section 111(a) with claiming the benefit of U.S. Provisional application Ser. No. 60/704,460 filed Aug. 2, 2005 under the provision of 35 U.S.C. Section 111(b), pursuant to 35 U.S.C. Section 119(e) (1).

TECHNICAL FIELD

The present invention relates to a solid electrolytic capacitor element using electroconductive polymer as solid electrolyte layer and a solid electrolytic capacitor using the element.

BACKGROUND ART

Recently, with developments on digitalization of electric devices and higher-speed personal computers, capacitors, downsized but having large capacitance and low impedance in a high-frequency region, are demanded, and there have been proposed solid electrolytic capacitors using electroconductive polymer having electron conductivity as solid electrolyte.

Generally, a basic element (6) of a solid electrolytic capacitor is produced by forming a dielectric oxide film layer (2) on an anode substrate (1) consisting of a metal foil having a large specific surface area increased by etching treatment as shown in FIG. 1, forming thereon a solid semiconductor layer (3) (hereinafter referred to as solid electrolyte) as a counter electrode, and desirably further forming a conductor layer (4) of conductive paste. Generally, in order to ensure insulation between solid electrolyte (3) (cathode part) and anode substrate (1), a masking layer (5) is further provided therebetween and then electrodes are added as appropriate.

Generally, a conductor layer (4) has a double-layer structure including a carbon paste layer in the inner side (to the electrolyte layer side) and a silver paste layer in the outer side. In order to suppress the equivalent series resistance (ESR) to a low level, it is desirable to reduce resistance of a cathode electrode including a conductor layer. Generally, since resistance in a carbon paste layer is larger than that in a silver paste layer, the ratio of the carbon paste layer against the silver paste layer may be reduced so that the resistance of the cathode electrode can be lowered. For example, in Patent Document 1 (Japanese Patent Application Laid-Open No. H11-135377) proposes that a conductor layer be formed only of a conductive metal layer such as silver paste layer.

However, since silver migrates in the electric field, a conductive path may be formed between a cathode and an anode due to the migration in a case where a carbon paste layer is not used as in the above patent document, which may lead to an increase in leakage current (LC).

In addition, recently, reduction in capacitor thickness has been demanded and to meet this demand, it is desirable that thickness of a cathode electrode be reduced to the minimum. However, there is a problem that reduction in a cathode electrode, especially in a silver paste layer leads to an increase in ESR.

As above, there are requirements conflicting with each other in configuration of a cathode electrode. Therefore, a cathode electrode where reduction in thickness, low ESR, low LC and the like are achieved at the same time has been demanded.

[Patent Document 1] Japanese Patent Application Laid-Open No. H11-135377

DISCLOSURE OF INVENTION

Problem to be Solved by Invention

Accordingly, the object of the present invention is to solve the above problem in conventional techniques and provide a solid electrolytic capacitor element where reduction in thickness is achieved and at the same time, ESR and LC values are lowered.

Means for Solving the Problem

As a result of extensive studies made with a view to achieving the above object, the present inventors have found out that thickness reduction can be achieved by a combination of thickness and composition of a specific silver paste layer and ESR and LC can be lowered at the same time to bring about improvements in the capacitor properties, to thereby complete the invention.

That is, according to the present invention, a solid electrolytic capacitor element and a solid electrolytic capacitor using the element is provided as follows.

1. A solid electrolytic capacitor element, comprising a metal oxide layer, an electroconductive polymer layer, a carbon paste layer and a silver paste layer sequentially formed on surface of a valve-acting metal material, wherein thickness of the silver paste layer is within a range of 5 to 20 μm and the mass ratio of silver contained in the silver paste layer is within a range of 84 to 94%.
2. The solid electrolytic capacitor element according to 1, wherein thickness of the carbon paste layer is within a range of 1 to 8 μm.
3. The solid electrolytic capacitor element according to 1 or 2, wherein the mass ratio of carbon contained in the carbon paste layer is within a range of 50 to 80%.
4. The solid electrolytic capacitor element according to any one of 1 to 3, wherein the silver paste layer contains silver particles having a longitudinal length of 1 to 5 μm at a mass ratio of 60% or more against the total silver particles.
5. The solid electrolytic capacitor element according to any one of 1 to 4, wherein the carbon paste layer contains carbon particles having a longitudinal length of 300 nm or less at a mass ratio of 10% or more against the total carbon particles.
6. The solid electrolytic capacitor element according to any one of 1 to 5, wherein the silver paste layer contains fluorine resin.
7. The solid electrolytic capacitor element according to any one of 1 to 6, wherein the carbon paste layer contains fluorine resin.
8. The solid electrolytic capacitor element according to any one of 1 to 7, wherein the carbon paste layer and/or the silver paste layer contain polyester resin.
9. The solid electrolytic capacitor element according to 8, wherein the carbon paste layer and/or the silver paste carbon paste layer are formed by coating with carbon paste and/or silver paste by immersion method.
10. The solid electrolytic capacitor element according to any one of 1 to 9, wherein the valve-acting metal material is a material containing at least one metal selected from a group consisting of aluminum, tantalum, niobium, titanium and zirconium.

11. The solid electrolytic capacitor element according to 10, wherein the valve-acting metal material is aluminum foil.

12. A solid electrolytic capacitor, using the solid electrolytic capacitor element described in any one of 1 to 11.

13. A stack-type solid electrolytic capacitor, produced by stacking a plurality of the solid electrolytic capacitor element described in any one of 1 to 11.

Effect of Invention

The present invention achieves reduction in thickness as well as ESR and LC to thereby improve properties of a solid electrolytic capacitor (element) using electroconductive polymer as a solid electrolyte layer, by controlling the thickness of a silver paste layer to be within a range of 5 to 20 μm and the mass ratio of silver contained in the silver paste layer to be within a range of 84 to 94%, and desirably further controlling the thickness of the carbon paste layer to be within a range of 1 to 8 μm and the mass ratio of carbon contained in the carbon paste layer to be within a range of 50 to 80%.

BRIEF DESCRIPTION OF DRAWINGS

FIG. 1 A sectional view showing a typical structure of a capacitor element for a solid electrolytic capacitor FIG. 2 A sectional view showing a typical structure of a capacitor obtained by stacking solid electrolytic capacitor elements

EXPLANATION OF REFERENCE NUMBERS 1 anode substrate
2 oxide film layer
3 solid electrolyte layer
4 conductor layer
5 masking layer
6 capacitor element
7 anode
8 cathode
9 sealing agent

BEST MODE FOR CARRYING OUT THE INVENTION

Hereinafter, the solid electrolytic capacitor element of the present invention is explained.

The solid electrolytic capacitor element of the present invention is formed by using a valve-acting metal as substrate. The valve-acting metal is preferably a valve-acting metal material having micropores, particularly preferably a valve-acting metal having a porous layer and a dielectric oxide film on the surface. Examples of valve-acting metal material include aluminum, tantalum, niobium, titanium, zirconium and foils, bars and sintered bodies of alloy-base metals having valve action containing these metals as base material. Preferred are metal foils, especially aluminum foil.

Although these metals each have a dielectric film formed as a result of oxidation of the surface caused by oxygen in the air, the metal surface is subjected to treatment such as etching treatment by known method to thereby make the surface porous in advance. Preferably, the surface is further subjected to chemical formation by known method to thereby ensure formation of dielectric oxide film. Known methods may be employed in forming a dielectric oxide film on a metal porous body. For example, in a case where an aluminum foil is used, an oxide film can be formed by causing anode oxidation in an aqueous solution containing boric acid, phosphoric acid, adipic acid or sodium salts or ammonium salts thereof. In a case where a sintered body of tantalum powder is used, an oxide film can be formed by causing anode oxidation in an aqueous solution of phosphoric acid.

It is preferable that the base material of metal having valve-action be, after subjected to surface roughening, cut into a predetermined size in advance to be suitable for the shape of solid electrolytic capacitor. In a case where a metal foil is used, those having a thickness of about 40 to 150 μm are generally used. However, a foil having a thickness outside this thickness range may be used depending on uses.

In the solid electrolytic capacitor of the present invention, in which a carbon paste layer is provided on a solid electrolyte layer and a silver paste layer is laminated thereon, the thickness of the silver paste layer is controlled to be in a range of 5 to 20 μm, and the mass ratio of silver contained in the silver paste layer is controlled to be in a range of 84 to 94%. If the thickness of the silver paste layer is less than 5 μm, ESR increases. In contrast, if the thickness of the silver paste layer exceeds 20 μm, reduction in the produced capacitor is difficult. If the mass ratio of silver is less than 84%, ESR increases. In contrast, if the mass ratio of silver exceeds 94%, film formation property and strength and durability of the film decrease. Here, the term "mass ratio of silver" represents a mass ratio of silver particles against the mass of the completed silver paste layer.

On the other hand, preferred thickness of the carbon paste layer is in a range of 1 to 8 μm, and the preferred mass ratio of the carbon paste layer is in a range of 50 to 80%. If the thickness of the carbon paste layer is less than 1 μm, LC may increase. In contrast, if the thickness of the carbon paste layer exceeds 8 μm, ESR tends to increase. If the mass ratio of the carbon is less than 50%, ESR increases. In contrast, if the mass ratio of carbon exceeds 80%, film formation property and strength and durability of the film decrease. Here, the term "mass ratio of carbon" represents a mass ratio of carbon particles against the mass of the completed carbon paste layer.

It is preferable that the silver paste layer contain silver particles having a longitudinal length of 1 to 5 μm at a mass ratio of 60% or more against the total silver particles. From a viewpoint of electroconductivity, it may be conceivable to prepare finer particles (see Patent Document 1), however, under conditions of layer thickness and layer composition according to the present invention, excellent effects can be obtained by using the above silver particles.

It is preferable that the carbon paste layer contain carbon particles having a longitudinal length of 300 nm or less at a mass ratio of 10% or more against the total carbon particles, so that resistance of the carbon paste layer can be reduced.

There is no particular limitation on other components contained in the silver paste and the carbon paste layer. Conventionally used binders such as fluorine resin, epoxy resin, acrylic resin, polyester resin, phenol resin and polyimide resin may be contained. Preferred among these is fluorine resin. By containing fluorine resin, the paste can increase its water-repellency and elasticity. Moreover, the present inventors have found out that, in a case where a polyester resin is used as a binder, the carbon paste or silver paste containing the resin can be excellent in wettability to the surface to be coated and especially can be reduced in ESR, which leads to reduction in capacitor thickness and brings about reduction both in ESR and LC at the same time, whereby improvements in properties of the produced capacitor. That is, in this case, a silver paste layer or a carbon paste layer can be formed by any of the methods described later. In a case where silver paste or carbon paste is used in a spray-coating method or the like, good contact between the silver paste or the carbon paste and the surface to be sprayed onto can be achieved, however, when the silver paste or the carbon paste is sprayed toward the surface, the amount of the silver paste or carbon paste which fails to land on the surface to be coated (such as aluminum foil), scattering around the surface to be wasted is generally 20% or more against the amount of the silver paste or carbon paste coating the surface, and in not a few cases, the amount exceeds 30% or more. In an immersion method, generally, the amount of the silver paste or the carbon paste to be wasted can be around 5% against the amount of the silver paste or carbon paste coating the surface, however, ESR of the obtained solid electrolytic capacitor element tends to be high as compared with ESR of the element obtained by employing the above spray-coating method. According to the findings of the present inventors, in a case where a polyester resin is used as a binder, since the carbon paste or silver paste containing it can be excellent in wettability to the coated surface and especially be reduced in ESR, ESR of the obtained solid electrolytic capacitor element is good enough to improve properties of the capacitor even in a case where the silver paste layer and the carbon paste layer are formed by immersion method. Therefore, in the present invention, either one of a carbon paste or silver paste containing a polyester resin as a binder may be applied by immersion method. In a case where both carbon paste and silver paste are applied by immersion method, ESR of the obtained solid electrolytic capacitor element can be reduced and at the same time, the amount of the silver paste and the carbon paste to be wasted can be significantly reduced. Further, the compositions defined in the present invention are final compositions of the silver paste and the carbon paste layers and during the process of forming the layers, appropriate solvent may be contained in the layers. Examples of the solvent include isoamyl acetate, butyl acetate, and cyclohexanone. However, these examples here are mentioned for purposes of illustration and not limitation. The used amount of the solvent depends on formation method of each layer. Generally, the amount is in a range of 10 to 95% based on the total mass of the paste at the time of forming the layer, preferably 40 to 90%.

The silver paste layer and carbon paste layer in the present invention can be formed by an arbitrary method. Examples of the method include immersion method where a substrate is immersed in a container containing a silver paste or a carbon paste, a method where a silver paste or a carbon paste is spread onto a substrate by using a spreader such as brush and blade, printing methods such as anastatic printing, intaglio printing, flat-plate printing, screen printing, and ink-jet printing, and other coating methods such as spray-coating and spin coating. Also, after employing any of these methods, the layer thickness may be adjusted by means of a wiper, an air-compressor, a suctioning means or others.

There is no particular limitation on electroconductive polymer to form a solid electrolyte. Examples of the solid electrolyte include electroconductive polymers containing as a repeating unit a structure represented by a compound having a thiophene skeleton, a compound having a polycyclic sulfide skeleton, a compound having a pyrrole skeleton, a compound having a furan skeleton, a compound having an aniline skeleton or the like.

Examples of compound having a thiophene skeleton include derivatives of 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene, and 3,4-ethylenedioxythiophene. These compounds are commercially available or can be prepared by known methods (for example, described in Synthetic Metals, 1986, Vol. 15, Page 169), however, the present invention is not limited to the examples.

Specific examples of compound having a polycyclic sulfide skeleton include compounds having a 1,3-dihydro polycyclic sulfide (also called 1,3-dihydrobenzo[c]thiophene) skeleton and compounds having a 1,3-dihydronaphtho[2,3-c]thiophene skeleton. Further, examples include compounds having a 1,3-dihydroanthra[2,3-c]thiophene skeleton, and compounds having 1,3-dihydro-naphthaceno[2,3-c] thiophene skeleton. These compounds can be prepared by a known method, for example, the method described in JP-A-8-3156.

In addition, for example, compounds having a 1,3-dihydronaphtho[1,2-c]thiophene skeleton, 1,3-dihydrophenanthra[2,3-c]thiophene derivatives, compounds having a 1,3-dihydrotriphenylo[2,3-c]thiophene skeleton and 1,3-dihydrobenzo[a]anthraceno[7,8-c]thiophene derivatives can be used.

Compounds optionally containing nitrogen or N-oxide in the condensed ring may also be used, and examples thereof include 1,3-dihydrothieno[3,4-b]quinoxaline, 1,3-dihydrothieno[3,4-b]quinoxaline-4-oxide and 1,3-dihydrothieno [3,4-b]quinoxaline-4,9-dioxide, however, the present invention is not limited thereto.

Examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. These compounds are commercially available or may be prepared by a known method, however, the present invention is not limited thereto.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds are commercially available or may be prepared by a known method, however, the present invention is not limited to these examples.

Examples of the compound having an aniline skeleton include derivatives of 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethylaniline, 3,4-butyleneaniline, 3,4-methylenedioxyaniline, and 3,4-ethylenedioxyaniline. These compounds are commercially available or may be prepared by a known method, however, the present invention is not limited to these examples.

Also, three of the above compounds may be used in combination as triblock copolymer. In this case, the composition ratio of polymerizable monomers depends on polymerization conditions and preferred ratio and polymerization conditions can be determined by conducting simple tests. However, the present invention covers general capacitors using a capacitor substrate having a solid electrolyte layer thereon and is not limited by the solid electrolyte and other structures above recited.

The capacitor is completed by forming on the electroconductive polymer, a carbon paste layer and a silver paste layer, connecting a lead terminal of the solid electrolytic capacitor to a lead frame connected to an anode part, connecting a lead wire to a cathode part consisting of solid electrolyte layer, carbon paste layer and metal-powder-containing electroconductive layer and then encapsulating the entirety with an insulative resin such as epoxy resin.

As shown in FIG. 2, by stacking a plurality of capacitor element (6), connecting anode lead wire (7) to an anode terminal, connecting cathode lead wire (8) to a conductor layer (not shown) containing solid electrolyte layer (3) and completely encapsulating the entirety with an insulative resin such as epoxy resin, a stacked-type capacitor may be prepared.

EXAMPLES

Hereinafter, the present invention is described in greater detail by referring to Examples and Comparative Examples.

Example 1

An aluminum foil having been etched to increase the surface area was cut into rectangular pieces of 3 mm×10 mm. The lower half of each of the rectangular aluminum foil pieces and an electrode were immersed in 10% aqueous ammonium adipate solution at a temperature of 80° C. and a voltage of 3 V was applied between the aluminum foil and the electrode for 10 minutes to chemically form the aluminum foil to thereby form a dielectric oxide film consisting of aluminum oxide on the surface of each of the lower half of the aluminum foil pieces. Then, an electroconductive polymer layer consisting of poly(3,4-ethylenedioxythiophene) was attached on the dielectric film by repeating a step of immersing the chemically formed aluminum foil in an isopropyl alcohol containing 3,4-ethylenedioxythiophene dissolved therein, followed by drying, and a step of immersing the chemically formed aluminum foil in an aqueous solution containing sodium anthraquinone sulfonate and ammonium persulfate dissolved therein, followed by drying. Furthermore, the aluminum foil having the electroconductive polymer layer formed thereon and an electrode were immersed in 10% aqueous ammonium adipate solution to perform chemical reformation of the dielectric layer.

On the electroconductive polymer layer, a carbon paste composed of 7% by mass of carbon particles, 3% by mass of fluorine resin and 90% by mass of isoamyl acetate was applied by sputtering from a spray. 30% of the total sprayed carbon paste failed to land on the aluminum foil and was wasted, scattering around the foil. The viscosity of the carbon paste was 60 cpoise. The coating carbon particles were composed of those having two different diameter ranges, one is from 10 to 100 nm and the other from 0.8 to 8 µm, and the mass ratio of the two types was 30 to 70. After drying at 130° C. for 10 minutes, the carbon paste layer had a thickness of 5 µm and 70% by mass of carbon particles was contained in the carbon paste layer. An incision of 1 mm×1 mm with a depth reaching the electroconductive polymer layer was created on the surface of the carbon paste layer, and a peel test for evaluating the adhesiveness between the carbon paste layer and the electroconductive polymer layer was conducted by sticking a piece of Sellotape (registered trademark) on the carbon paste layer and then peeling it off. As a result of the evaluation on 100 areas, there was no area where carbon paste was peeled off with the Sellotape.

Next, on the carbon paste layer, a silver paste composed of 54% by mass of silver particles, 6% by mass of fluorine resin and 40% by mass of isoamyl acetate was applied by sputtering from a spray. 30% of the total sprayed silver paste failed to land on the aluminum foil and was wasted, scattering around the foil. The viscosity of the silver paste was 400 cpoise. The coating silver particles were in flake form and each having a longitudinal length of from 1 to 5 µm. After drying at 130° C. for 10 minutes, the silver paste layer had a thickness of 15 µm and 90% by mass of silver particles was contained in the silver paste layer. The thickness of the whole foil including the aluminum oxide layer, the carbon paste layer and the silver paste layer was 180 µm. An incision of 1 mm×1 mm with a depth reaching the carbon paste layer was created on the surface of the silver paste layer and a peel test for evaluating the adhesiveness between the silver paste layer and the carbon paste layer was conducted by sticking a piece of Sellotape (registered trademark) on the silver paste layer and peeling it off. As a result of the evaluation on 100 areas, there was no area where silver paste was peeled off with the Sellotape.

Two sheets of the aluminum foil each having an aluminum oxide layer, an electroconductive polymer layer, a carbon paste layer and a silver paste layer sequentially formed thereon were stacked on a lead flame. The portions on which no aluminum oxide layer, electroconductive polymer layer, carbon paste layer or silver paste layer had been formed were welded to the lead flame. The thus stacked aluminum foil sheets were sealed with an epoxy resin to thereby produce a chip capacitor.

As a result of evaluations by a LCR meter, capacitance of the obtained capacitors was 103.1 µF at 120 Hz, ESR value was 8.7 mΩ at 100 kHz. As a result of measuring a leakage current by applying a voltage of 2V to 100 units of capacitor, all of the 100 units had a leakage current of 5 µA or less.

Example 2

Capacitor elements were produced in the same manner as in Example 1 except that a carbon paste composed of 5.4% by mass of carbon particles, 4.6% by mass of fluorine resin and 90% by mass of isoamyl acetate was stacked in thickness of 2 µm and that a silver paste composed of 51% by mass of silver particles, 9% by mass of fluorine resin and 40% by mass of isoamyl acetate was coated in thickness of 7 µm.

In this Example, 54% by mass of carbon particles was contained in the carbon paste layer and 85% by mass of silver particles was contained in the silver paste layer.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there was no area where silver paste layer was peeled off.

As a result of evaluations on the obtained capacitor conducted in the same manner as in Example 1, capacitance of the obtained capacitors was 102.2 µF at 120 Hz, ESR value was 8.6 mΩ at 100 kHz. All of the evaluated capacitor units had a leakage current of 5 µA or less when a voltage of 2V was applied.

Example 3

Capacitor elements were produced in the same manner as in Example 1 except that a carbon paste composed of 7.6% by mass of carbon particles, 2.4% by mass of fluorine resin and 90% by mass of isoamyl acetate was stacked in thickness of 7 µm and that a silver paste composed of 55% by mass of silver particles, 5% by mass of fluorine resin and 40% by mass of isoamyl acetate was stacked in thickness of 18 µm.

In this Example, 76% by mass of carbon particles was contained in the carbon paste layer and 92% by mass of silver particles was contained in the silver paste layer.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there was no area where silver paste layer was peeled off.

As a result of evaluations on the obtained capacitors conducted in the same manner as in Example 1, capacitance of the obtained capacitors was 103.9 µF at 120 Hz, ESR value was 8.6 ma at 100 kHz. All of the evaluated capacitor units had a leakage current of 5 µA or less when a voltage of 2V was applied.

Comparative Example 1

Capacitor elements were produced in the same manner as in Example 1 except that the carbon paste stacked was 30 µm in thickness and that the silver paste stacked was 40 µm in thickness.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there was no area where silver paste layer was peeled off.

As a result of evaluations on the obtained capacitor conducted in the same manner as in Example 1, capacitance of the obtained capacitor was 102.1 µF at 120 Hz, ESR value was 12.7 mΩ at 100 kHz. All of the evaluated capacitor units had a leakage current of 5 µA or less when a voltage of 2V was applied.

The ESR value of the capacitors produced in Comparative Example 1 was higher than that of the capacitors produced in Example 1.

Also, the thickness of the entire foil thickness after coating with a silver paste layer in Comparative Example 1 was 280 µm, thicker than 180 µm of Example 1. Therefore, the capacitance per unit volume of the capacitors produced in Comparative Example 1 was smaller than that of Example 1.

Comparative Example 2

Capacitor elements were produced in the same manner as in Example 1 except that the silver paste stacked was 2 µm in thickness.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there was no area where silver paste layer was peeled off.

As a result of evaluations on the obtained capacitors conducted in the same manner as in Example 1, capacitance of the obtained capacitors was 102.7 µF at 120 Hz, ESR value was 35.1 mΩ at 100 kHz. All of the evaluated capacitor units had a leakage current of 5 µA or less when a voltage of 2V was applied.

The ESR value of the capacitors produced in Comparative Example 2 was higher than that of Example 1.

Comparative Example 3

Capacitor elements in Comparative Example 3 were produced in the same manner as in Example 1 except that the silver paste stacked was 40 µm in thickness.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there was no area where silver paste layer was peeled off.

As a result of evaluations on the obtained capacitors conducted in the same manner as in Example 1, capacitance of the obtained capacitors was 103.9 µF at 120 Hz, ESR value was 8.9 mΩ at 100 kHz. All of the evaluated capacitor units had a leakage current of 5 µA or less when a voltage of 2V was applied.

Properties of the capacitors obtained in Comparative Example 3 were in a level equivalent to Example 1. The entire foil thickness after coating with a silver paste layer was 230 µm, thicker than 180 µm of Example 1. Therefore, the capacitance per unit volume of the capacitors produced in Comparative Example 3 was smaller than that of Example 1.

Comparative Example 4

Capacitor elements in Comparative Example 4 were produced in the same manner as in Example 1 except that a silver paste composed of 48% by mass of silver particles, 12% by mass of fluorine resin and 40% by mass of isoamyl acetate was stacked. As a result of this, 80% by mass of silver particles was contained in the silver paste layer.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there was no area where silver paste layer was peeled off.

As a result of evaluations on the obtained capacitors conducted in the same manner as in Example 1, capacitance of the obtained capacitors was 102.4 µF at 120 Hz, ESR value was 15.5 mΩ at 100 kHz. All of the evaluated capacitor units had a leakage current of 5 µA or less when a voltage of 2V was applied.

The ESR value of the capacitors produced in Comparative Example 4 was higher than that of the capacitors produced in Example 1.

Comparative Example 5

Capacitor elements in Comparative Example 5 were produced in the same manner as in Example 1 except that a silver paste composed of 57% by mass of silver particles, 3% by mass of fluorine resin and 40% by mass of isoamyl acetate was stacked. As a result of this, 95% by mass of silver particles was contained in the silver paste layer.

As a result of a peel test on 100 areas of the carbon paste layer conducted in the same procedure as in Example 1, there was no area where carbon paste layer was peeled off. As a result of a peel test on 100 areas of the silver paste layer conducted in the same procedure as in Example 1, there were 24 areas where silver paste layer was peeled off.

As a result of evaluations on the obtained capacitor conducted in the same manner as in Example 1, capacitance of the obtained capacitor was 103.5 µF at 120 Hz, ESR value was 9.1 mΩ at 100 kHz. All of the evaluated capacitor units had a leakage current of 5 µA or less when a voltage of 2V was applied.

The silver paste layer of the capacitors produced in Comparative Example 5 was low in adhesiveness to the carbon paste layer and therefore reliability of the capacitors was poor.

Example 4

A dielectric film and an electroconductive polymer layer were formed on an aluminum foil and the foil was subjected to chemical reformation in the same manner as in Example 1. Then the foil was immersed in carbon paste prepared in the same manner as in Example 1 for 5 seconds to thereby form a carbon paste layer. When the carbon paste was applied by dip coating, 4% of the total carbon paste adhered to the wall of the carbon paste tank and was wasted instead of coating the aluminum foil. As compared with the percentage 30%, the amount of the carbon paste wasted in Example 1 using spraying method, the amount of the carbon paste wasted in Example 4 was 4% of the total amount, which was significantly low.

After drying at 130° C. for 10 minutes, the carbon paste layer had a thickness of 5 μm. As a result of a peel test of the carbon paste layer conducted on 100 areas in the same procedure as in Example 1, there was no area where carbon paste layer was peeled off.

Next, the aluminum foil having a carbon paste formed thereon was immersed in a silver paste prepared in the same way as in Example 1 for 10 seconds to thereby form a silver paste layer. When the silver paste was applied by dip coating, 4% of the total silver paste adhered to the wall of the silver paste tank and was wasted instead of coating the aluminum foil. As compared with the percentage 30%, the amount of the silver paste wasted in Example 1 using spraying method, the amount of the silver paste wasted here in Example 4 was significantly low.

After drying at 130° C. for 10 minutes, the silver paste layer had a thickness of 15 μm. As a result of a peel test of the silver paste layer conducted on 100 areas in the same procedure as in Example 1, there was no area where the silver paste layer was peeled off.

As a result of evaluations on the obtained capacitors conducted in the same manner as in Example 1, capacitance of the obtained capacitors was 102.0 μF at 120 Hz, ESR value was 9.8 mΩ at 100 kHz. Presumably, as a result of coating the carbon paste layer containing a fluororesin as binder with a silver paste containing isoamyl acetate as solvent, wettability of the silver paste against the carbon paste was low and the silver paste was repelled, to decrease the contact area between the carbon paste and the silver paste as compared with the contact area in Example 1 in which the pastes were applied by spraying, causing an increase in the ESR here. All of the 100 evaluated capacitor units had a leakage current of 5 μA or less when a voltage of 2V was applied.

Example 5

A dielectric film and an electroconductive polymer layer were formed on an aluminum foil and the foil was subjected to chemical reformation in the same manner as in Example 1. Then the foil was immersed in a carbon paste composed of 7% by mass of carbon particles, 3% by mass of polyester resin and 90% by mass of isoamyl acetate for 5 seconds to thereby form a carbon paste layer. As compared with the percentage 30%, the amount of the carbon paste wasted in Example 1 using spraying method, the amount of the carbon paste wasted here, 4% of the total amount, was significantly low.

The viscosity of the carbon paste was 40 cpoise. The coated carbon particles were composed of those having two different diameter ranges, one is from 10 to 100 nm and the other from 0.8 to 8 μm, and the mass ratio of these two types was 30 to 70. After drying at 130° C. for 10 minutes, the carbon paste had a thickness of 5 μm and 70% by mass of carbon particles was contained in the carbon paste layer. As a result of a peel test on 100 area of the carbon paste layer conducted in the same procedure as in Example 1, there was no area where the carbon paste was peeled off.

Next, the aluminum foil having a carbon paste formed thereon was immersed in a silver paste composed of 54% by mass of silver particles, 6% by mass of fluorine resin and 40% by mass of isoamyl acetate for 10 seconds to thereby form a silver paste layer. As compared with the percentage 30%, the amount of the silver paste wasted in Example 1 using spraying method, the amount of the silver paste wasted here, 4% of the total amount, was significantly low.

The viscosity of the silver paste was 400 cpoise. The coated silver particles were in flake form and had a longitudinal length of 1 to 5 μm. After drying at 130° C. for 10 minutes, the silver paste had a thickness of 15 μm and 90% by mass of silver particles was contained in the silver paste layer. As a result of a peel test on 100 areas of the silver paste layer conducted in the same procedure as in Example 1, there was no area where the silver paste layer was peeled off.

As a result of evaluations on the obtained capacitors conducted in the same manner as in Example 1, capacitance of the obtained capacitors was 102.9 μF at 120 Hz, ESR value was 8.5 mΩ at 100 kHz. Presumably, as a result of coating the carbon paste layer containing a polyester resin as binder with a silver paste containing isoamyl acetate as solvent, wettability of the silver paste against the carbon paste was high as compared with Example 4 using a fluororesin as a binder in the carbon paste, to increase the contact area between the carbon paste and the silver paste here in Example 5, thus causing a decrease in the ESR here. All of the 100 evaluated capacitor units had a leakage current of 5 μA or less when a voltage of 2V was applied.

The above-mentioned results were shown in Table 1 collectively.

TABLE 1

| | Layer Thickness (μm) | | | Particle Mass ratio | | Layer peel ratio | | Capacitor Characteristic | | |
|---|---|---|---|---|---|---|---|---|---|---|
| | Carbon Paste layer | Silver Paste layer | Foil ThickNess (μm) | Carbon particle in Carbon Paste layer (%) | Silver particle in silver Paste layer (%) | Carbon Paste Layer (%) | Carbon Paste Layer (%) | Capacity (μF) | Probability to be 5 μA or less LC (%) | ESR at 100 kHZ (mΩ) |
| Ex. 1 | 5 | 15 | 180 | 70 | 90 | 0 | 0 | 103.1 | 100 | 8.7 |
| Ex. 2 | 2 | 7 | 158 | 54 | 85 | 0 | 0 | 102.2 | 100 | 8.6 |

TABLE 1-continued

| Layer Thickness (μm) | | | Particle Mass ratio | | Layer peel ratio | | Capacitor Characteristic | | |
|---|---|---|---|---|---|---|---|---|---|
| | | | Carbon particle in | Silver particle in | | | | Probability | |
| Carbon Paste layer | Silver Paste layer | Foil ThickNess (μm) | Carbon Paste layer (%) | silver Paste layer (%) | Carbon Paste Layer (%) | Carbon Paste Layer (%) | Capacity (μF) | to be 5 μA or less LC (%) | ESR at 100 kHZ (mΩ) |
| Ex. 3 | | | | | | | | | |
| 7 | 18 | 190 | 76 | 92 | 0 | 0 | 103.9 | 100 | 8.6 |
| Com. Ex. 1 | | | | | | | | | |
| 30 | 40 | 280 | 70 | 90 | 0 | 0 | 102.1 | 100 | 12.7 |
| Com. Ex. 2 | | | | | | | | | |
| 5 | 2 | 154 | 70 | 90 | 0 | 0 | 102.7 | 100 | 35.1 |
| Com. Ex. 3 | | | | | | | | | |
| 5 | 40 | 230 | 70 | 90 | 0 | 0 | 103.9 | 100 | 8.9 |
| Com. Ex. 4 | | | | | | | | | |
| 5 | 15 | 180 | 70 | 80 | 0 | 0 | 102.4 | 100 | 15.5 |
| Com. Ex. 5 | | | | | | | | | |
| 5 | 15 | 180 | 70 | 95 | 0 | 24 | 103.5 | 100 | 9.1 |
| Ex. 4 | 5 | 15 | — | 70 | 90 | 0 | 0 | 102.0 | 100 | 9.8 |
| Ex. 5 | 5 | 15 | — | 70 | 90 | 0 | 0 | 102.9 | 100 | 8.5 |

In Example 1 using a carbon paste containing a fluorine resin as a binder which was applied by spray-coating method, solid electrolytic capacitors having an ESR of 8.7 mΩ were obtained with loss of 30% of the carbon paste. In Example 4 using a carbon paste containing a fluorine resin as a binder which was applied by dipping, solid electrolytic capacitors having an ESR of 9.8 mΩ were obtained with loss of 4% of the carbon paste. In Example 5 using a carbon paste containing a polyester resin as a binder which was coated by dipping, solid electrolytic capacitors having an ESR of 8.5 mΩ were obtained with loss of 4% of the carbon paste. According to the results, Example 1 obtained solid electrolytic capacitors having low ESR but the amount of wasted carbon paste was large, and Example 4 obtained solid electrolytic capacitors having relatively high ESR but the amount of wasted carbon paste was small, whereas Example 5 obtained solid electrolytic capacitors having low ESR with a smaller amount of wasted carbon paste.

INDUSTRIAL APPLICABILITY

A solid electrolytic capacitor having good electric properties such as ESR (equivalent series resistance) and LC (leakage current) can be produced by adjusting the layer thickness and composition of a silver paste layer within a specific range. Moreover, a capacitor element of the present invention has a thin electroconductive layer so that reduction in thickness of capacitor can be achieved and is useful especially in a stacked capacitor.

The invention claimed is:

1. A solid electrolytic capacitor element, comprising a metal oxide layer, an electroconductive polymer layer, a carbon paste layer and a silver paste layer sequentially formed on surface of a valve-acting metal material, wherein thickness of the silver paste layer is within a range of 5 to 20 μm and the mass ratio of silver contained in the silver paste layer is within a range of 84 to 94%;
   wherein thickness of the carbon paste layer is within a range of 1 to 8 μm; and
   wherein the mass ratio of carbon contained in the carbon paste layer is within a range of 50 to 80%.
2. The solid electrolytic capacitor element according to claim 1, wherein the silver paste layer contains silver particles having a longitudinal length of 1 to 5 μm at a mass ratio of 60% or more against the total silver particles.
3. The solid electrolytic capacitor element according to claim 1, wherein the carbon paste layer contains carbon particles having a longitudinal length of 300 nm or less at a mass ratio of 10% or more against the total carbon particles.
4. The solid electrolytic capacitor element according to claim 1, wherein the silver paste layer contains fluorine resin.
5. The solid electrolytic capacitor element according to claim 1, wherein the carbon paste layer contains fluorine resin.
6. The solid electrolytic capacitor element according to claim 1, wherein the carbon paste layer and/or the silver paste layer contain polyester resin.
7. The solid electrolytic capacitor element according to claim 6, wherein the carbon paste layer and/or the silver paste carbon paste layer are formed by coating with carbon paste and/or silver paste by immersion method.
8. The solid electrolytic capacitor element according to claim 1, wherein the valve-acting metal material is a material containing at least one metal selected from a group consisting of aluminum, tantalum, niobium, titanium and zirconium.
9. The solid electrolytic capacitor element according to claim 8, wherein the valve-acting metal material is aluminum foil.
10. A solid electrolytic capacitor, using the solid electrolytic capacitor element described in claim 1.
11. A stack-type solid electrolytic capacitor, produced by stacking a plurality of the solid electrolytic capacitor element described in claim 1.

* * * * *